(12) United States Patent
Loomis

(10) Patent No.: US 6,275,185 B1
(45) Date of Patent: *Aug. 14, 2001

(54) GPS RECEIVER USING COARSE ORBITAL PARAMETERS FOR ACHIEVING A FAST TIME TO FIRST FIX

(75) Inventor: Peter Van Wyck Loomis, Sunnyvale, CA (US)

(73) Assignee: Trimble Navigation Limited, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/759,307

(22) Filed: Jan. 12, 2001

Related U.S. Application Data

(63) Continuation of application No. 09/401,442, filed on Sep. 22, 1999.

(51) Int. Cl.[7] ............... G01S 5/02; H04B 7/185
(52) U.S. Cl. ............... 342/357.14; 342/357.12
(58) Field of Search ............... 342/357.14, 357.12

(56) References Cited

U.S. PATENT DOCUMENTS 6,185,427 * 2/2001 Krasner et al. ............... 455/456
6,225,945 * 5/2001 Loomis ............... 342/357.12

* cited by examiner

Primary Examiner—Thomas H. Tarcza
Assistant Examiner—Fred H Mull
(74) Attorney, Agent, or Firm—David R. Gildea

(57) ABSTRACT

A GPS receiver having a fast time to first fix by comparing measured range rates for GPS satellites to GPS satellite velocities that are calculated from coarse GPS satellite orbital parameters. The coarse GPS satellite parameters are GPS almanac parameters or GPS ephemeris parameters that are older than the GPS-specified curve fit interval. The GPS receiver includes a satellite velocity calculator and a satellite line-of-sight calculator using the coarse GPS satellite orbital parameters previously stored in memory for calculating GPS satellite velocities and unit vectors to GPS satellites, respectively; a range rate measurer using GPS signal carrier measurements for determining range rates to GPS satellites; a user velocity calculator using the satellite velocities, unit vectors, and range rates for calculating a user velocity; and a user location integrator for integrating the user velocity from the last user location for a first location fix. Optionally, the user velocity calculator provides user direction information that can be used for initializing an inertial navigation device.

24 Claims, 2 Drawing Sheets

GPS RECEIVER USING COARSE ORBITAL PARAMETERS FOR ACHIEVING A FAST TIME TO FIRST FIX

This application is a continuation of application Ser. No. 09/401,442, filed Sep. 22, 1999.

BACKGROUND OF THE INVENTION

1. Field of the Invention

The invention relates generally to GPS receivers and more particularly to a GPS receiver having a fast time to first fix by comparing GPS satellite range rates measured from the GPS signal carriers to GPS satellite velocities calculated from coarse GPS satellite orbital parameters even when the orbital parameters are not current.

2. Description of the Prior Art

The global positioning system (GPS) is a satellite based location and time transfer system developed by the United States government and available free of charge to all users. A GPS user location is based upon one-way ranging between the user and GPS satellites. The GPS satellites transmit signals having the times-of-transmission and orbital parameters for their respective time variable locations-in-space. A GPS receiver acquires the GPS signals by correlating internal replica signals to the carrier frequencies and distinguishable codes for each of several in-view GPS satellites. When the GPS signals have been acquired, the GPS receiver uses the times and orbital parameters for measuring ranges to four or more GPS satellites. These ranges are called pseudoranges because they include a term caused by a time error of the internal clock in the GPS receiver.

The GPS satellite pseudoranges are measured by determining phase offsets between GPS pseudorandom (PRN) codes received in the GPS signals and internal GPS replica PRN codes referenced to the internal clock. Some GPS receivers measure and integrate the carrier phases of the GPS signals in order to reduce the noise on the measured phase offsets. The GPS receiver then determines a GPS-based time by monitoring the GPS signals until a Z-count is decoded. The GPS-based time is used to determine the times that the phase offsets were measured. The measurement times are then used with ephemeris data that is received in the GPS signals for calculating the instantaneous locations-in-space of several GPS satellites and for linearizing location equations relating the calculated locations-in-space to the measured pseudoranges. Having four or more linearized location equations for four or more GPS satellites, respectively, the GPS receiver can resolve the three dimensions of geographical location of the GPS receiver and correct the error in the internal clock time.

Two types of orbital parameters are transmitted for determining locations-in-space for the satellites: almanac data and ephemeris data. The almanac data includes relatively few parameters and is generally sufficient for determining locations-in-space to a few kilometers. Each GPS satellite broadcasts the almanac data for all the GPS satellites on a twelve and one-half minute cycle and is updated every few days. Almanac data is typically used by GPS receivers that have been off for more than a few hours for determining which GPS satellites are in-view and is sometimes used for determining lines-of-sight to the satellites for the linearized location equations. However, the GPS almanac data is generally not used for determining the pseudoranges in the linearized location equations because the inaccuracy of the location-in-space of a GPS satellite transfers to an inaccuracy of the user location for the GPS receiver. In the past, some GPS receivers have used almanac data for pseudoranges for determining a user location. However, the user location accuracy using almanac-based pseudoranges was not satisfactory, and so far as is known this technique is no longer in use.

The ephemeris data provides relatively more parameters and is much more accurate. Typically, current ephemeris data is sufficient for determining locations-in-space to a few meters without selective availability or a few tens of meters at current levels of selective availability. Each GPS satellite broadcasts its own ephemeris data on a thirty second cycle. Ephemeris data is updated each hour. However, after about two hours the accuracy of the ephemeris data begins degrading. Typically, ephemeris data that is more than about four hours old is avoided for determining the pseudoranges for a user location.

A fast time to first fix, defined as the first accurate location fix after a several hours without location fixes, is desirable or required in certain applications for GPS receivers. For example, it is desirable for a vehicle navigation GPS receiver that has been overnight in a parking garage and then driven onto a street to show a location as soon as possible for customer satisfaction. For vehicle tracking for fire engines, ambulances, other dispatched vehicles, and the like, it is essential for the tracking station to beginning tracking as soon as possible and highly desirably to at least know if the vehicle has turned right or left upon leaving a station or garage. GPS receivers in vehicle navigation and vehicle tracking are typically coupled with map matching and inertial navigation in order to fill in gaps when driving due to the GPS signal being blocked. Simply knowing whether the vehicle has turned right or left after it leaves a garage or station is a great aid to the map matching algorithms. In certain vehicle tracking applications, such as fire and ambulance service, the tracking dispatcher can save valuable seconds just by knowing if a service vehicle has turned the wrong way out of a station.

Inertial navigation devices such as gyro-compasses can become disoriented during overnight inactivity or in the multiple circles of a multi-level parking garage. Upon leaving the garage a fast time for determining a new heading direction is desirable in order to re-initialize the gyro-compass or inertial device to begin accurate operation as soon as possible.

In a typical GPS receiver, the time to acquire new ephemeris data is a major portion of the time to a first location fix and to a determination of a first new heading direction. Typically, the ephemeris data is obtained directly from the GPS satellites in the GPS signals. However, up to about thirty seconds is required to acquire ephemeris data in this manner. Several proposals to eliminate this thirty seconds have been made. First, the GPS signals can be rebroadcast to a vehicle inside of the garage or station so that the GPS receiver can continue to get updated ephemeris. However, such re-broadcasting requires a costly GPS repeater. Second, if location is not needed in the vehicle, the location of the vehicle can be computed at a base station where current ephemeris data is available. In this case, raw pseudoranges are sent to the base station along with the satellite identifications and times. Third, if the location is needed at the vehicle, the base station sends the current ephemeris data including the satellite identifications and times to the vehicle for location determination. The latter two schemes can be attractive for systems where radio equipment is already required. Unfortunately, many applications for GPS receivers, including vehicle navigation, do not otherwise require a radio. Even in applications where a radio is required, such as vehicle tracking, the tracking system may not be set up for transmitting ephemeris data or receiving raw pseudoranges. Further, a relatively long string of data is required for radio transmission of ephemeris. In summary, all these proposals for providing new ephemeris data in some other way than receiving it in the GPS signal have limitations.

There is a need for an GPS receiver having a fast time to first fix without the use of new GPS ephemeris data.

SUMMARY OF THE INVENTION

It is therefore an object of the present invention to provide a GPS receiver having a fast time to first fix by comparing measured range rates with calculated GPS satellite velocities based upon coarse GPS satellite orbital parameters previously stored in memory for determining a user velocity and then integrating the user velocity from a last known location fix.

Another object of the present invention is to provide a new heading direction from a user velocity determined by comparing measured range rates with calculated GPS satellite velocities based upon coarse satellite orbital parameters previously stored in memory.

Briefly, in a preferred embodiment, when current ephemeris information is available a GPS receiver of the present invention operates in a conventional manner for determining location by using the ephemeris data for determining pseudoranges and using the pseudoranges for calculating location. When current ephemeris data is not available, the GPS receiver uses GPS almanac data or old GPS ephemeris data, herein termed coarse satellite orbital parameters, for determining a user velocity and then integrating the user velocity from the last known location to obtain a first new location fix. The GPS receiver of the present invention includes a satellite velocity calculator and a satellite line-of-sight calculator using the coarse GPS satellite orbital parameters previously stored in memory for calculating GPS satellite velocities and unit vectors to GPS satellites, respectively; a range rate measurer using GPS signal carrier measurements for determining range rates to GPS satellites; a user velocity calculator using the satellite velocities and unit vectors with the range rates for calculating a user velocity; and a user location integrator for integrating the user velocity from the last user location for a first location fix. Optionally, the user velocity calculator provides user direction information that can be used for initializing an inertial navigation device.

An advantage of the GPS receiver of the present invention is that current GPS ephemeris data is not required for providing a first GPS-based location fix.

Another advantage of the GPS receiver of the present invention is that current GPS ephemeris data is not required for providing a first GPS-based user direction.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
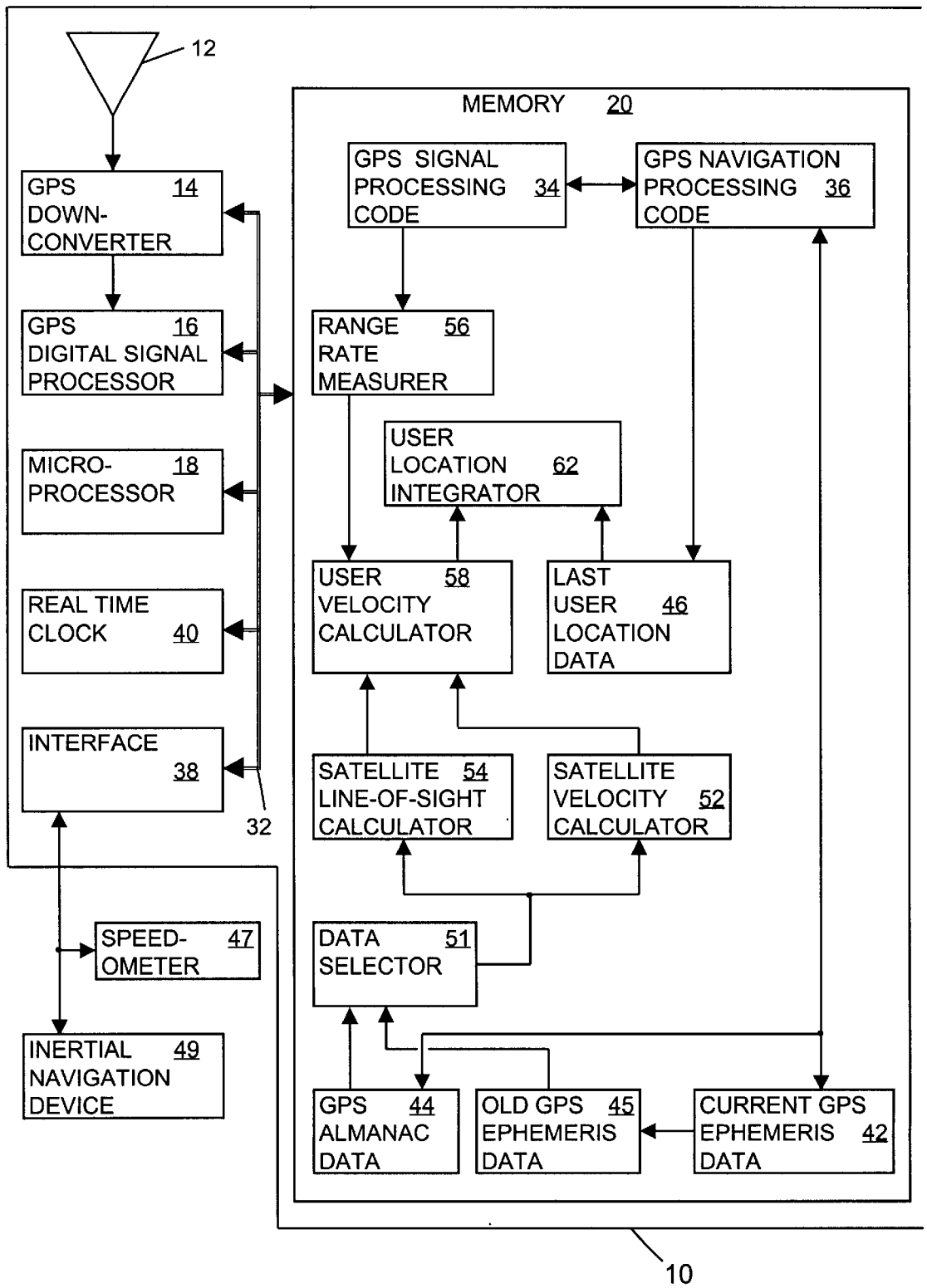
FIG. 1 is a block diagram of a GPS receiver of the present invention.

FIG. 1 is a block diagram of a GPS receiver of the present invention referred to by the general reference number 10.

The GPS receiver 10 receives GPS signals from GPS satellites or other GPS signal sources such as GPS pseudolites. The GPS signal from each of the GPS satellites has an L-band carrier signal at nominally the same frequency modulated by GPS data bits of twenty milliseconds that are spread by a pseudorandom (PRN) code that repeats every one millisecond. The GPS data bits and the PRN codes of all the GPS satellites are synchronized to transmit at the same times beginning with 00 hours, 00 minutes, 00.000 seconds of each GPS week and continuing throughout the week. The PRN code from each GPS satellite is distinct, thereby allowing a GPS receiver to distinguish the GPS signal from one of the GPS satellites from the GPS signal from another of the GPS satellites. Although the frequencies of the carrier signals from all the GPS satellites are nominally the same, each of the GPS signals is subject to Doppler frequency shift due to the relative velocity between the GPS satellite and the GPS receiver 10.

The GPS data bits are segmented into 1500 bit frames, also called pages, of thirty seconds. The frame in each GPS signal includes the ephemeris orbital parameters for the GPS satellite transmitting that GPS signal and a portion of the almanac orbital parameters for all the GPS satellites. The frames are segmented into five 300 bit subframes of six seconds each. The subframes are segmented into thirty 10 bit words. Each subframe begins with a known preamble and includes a Z-count. The Z-count gives GPS-based time-of-transmission for the preamble. Approximately two subframes are used for the ephemeris and approximately one subframe is used for the portion of the almanac within each frame. The complete almanac is transmitted by each GPS satellite in twenty-five frames (pages). The ephemeris orbital parameters are highly accurate and are updated each hour. Typically, the ephemeris parameters are not considered accurate enough for determining pseudoranges for calculating a user location for the GPS receiver 10 when the ephemeris is older than a curve fit interval specified for the global positioning system by the United States government. Currently, the curve fit interval is specified at four hours. The almanac orbital parameter are about 100 times less accurate and, although they are updated every few days, old almanac data is typically useful for several weeks for determining satellite visibility from the GPS receiver 10. A more complete description of the global positioning system specification entitled "Interface Control Document (ICD)-GPS-200, Navstar GPS Space Segment/Navigation User Interfaces, Rev. C" is available from ARINC Research Center, El Segundo, Calif., initial release of 10 Oct. 1993 and last revised Sep. 25, 1997.

The GPS receiver 10 includes a GPS antenna 12, a GPS downconverter 14, a GPS digital signal processor 16, a microprocessor 18, and a memory 20. The GPS antenna 12 receives radio frequency (RF) GPS signals from in-view GPS satellites and passes representative conducted RF GPS signals to the GPS downconverter 14. The GPS downconverter 14 includes a reference oscillator for providing a reference clocking signal for frequency downconverting and quantizing the conducted RF GPS signals and providing quantized I (in-phase) and Q (quadrature phase) GPS signals at a lower frequency to the GPS digital signal processor 16. The quantized GPS signals simultaneously includes Doppler shifted carriers modulated by the GPS data bits spread by the pseudorandom (PRN) code from each of the in-view GPS satellites.

The GPS digital signal processor 16 uses the reference clocking signal from the GPS downconverter 14 for an internal time base for generating I and Q GPS replica signals and providing correlation data for the correlations between the internal GPS replica signals and the incoming quantized GPS signals. The replica signals replicate the PRN codes and carriers for each of the GPS satellites that the GPS receiver 10 is tracking or attempting to acquire. The microprocessor 18 receives the correlation data over a signal bus 32 and executes programmed directions from a GPS signal processing code 34 in the memory 20 for measuring the code and carrier phases and issuing responsive feedback adjustments to the GPS digital signal processor 16 over the bus 32.

The code phase feedback adjustments offset the respective phases of the replica PRN codes with respect to the internal time base to drive the replica PRN codes to correlate with the PRN codes in the incoming GPS signals. The carrier phase feedback adjustments offset the respective phases of the replica carriers to compensate for phase error in the reference clocking signal and correlate with the carrier phases of the Doppler frequency shifted incoming GPS signals. In an alternative embodiment, the GPS signal processing code 34 measures and provides feedback adjustments for the respective frequencies of the replica carriers to compensate for the frequency error in the reference clocking signal and correlate with the carrier frequencies of the Doppler frequency shifted incoming GPS signals. When the correlations achieve certain thresholds, the GPS signal is said to have been acquired. A GPS navigation processing code 36 stored in the memory 20 receives information for inversions in the correlations of the PRN code phases from the GPS signal processing code 34 for determining the GPS data bits.

An interface 38 coupled to the microprocessor 18 over the bus 32 enables a human user and/or electronic devices to communicate with the GPS receiver 10. A real time clock 40 is controlled by the microprocessor 18 over the bus 32. During operation, when the GPS receiver 10 is providing location fixes, the microprocessor 18 executes instructions in the GPS navigation processing code 36 for aligning the time of the real time clock 40 to GPS-based time. When the GPS receiver 10 is not providing location fixes the real time clock 40 continues to provide an approximate time based upon the last GPS-based time. The microprocessor 18 may include several chips interconnected directly or over the bus 32 in order to perform in a conventional manner for reading and writing data in the memory 20, reading executable program codes in the memory 20, and controlling and receiving information from the GPS downconverter 14, the GPS digital signal processor 16, the interface 38, and the real time clock 40. The memory 20 may include several separate chips and/or other storage devices. Although in the preferred embodiment certain elements are implemented with stored program code in the memory 20 that is executed by the microprocessor 18 and certain elements are implemented in hardware, it should be understood by those of ordinary skill that there are alternative embodiments in which one or more of the program codes of the present invention is implemented in hardware and/or one or more of the hardward elements of the present invention are implemented with program codes.

During operation, the GPS navigation processing code 36 uses information in the GPS data bits for updating and storing the GPS ephemeris orbital parameters in the memory 20 as current GPS ephemeris data 42 and the GPS satellite almanac orbital parameters in the memory 20 as GPS almanac data 44. During non-operation when the GPS receiver 10 is turned off or into standby, or when GPS signals are blocked, the GPS ephemeris data 42 is not being updated and therefore begins to age. When the GPS receiver 10 begins operation after a period of non-operation, the GPS navigation processing code 36 or the GPS signal processing code 34 compares the age of the ephemeris orbital parameters in the GPS ephemeris data 42 to a selected aging time period. When the GPS ephemeris data 42 is older than the aging time period, the ephemeris orbital parameters are no longer considered current and are designated in the memory 20 as old GPS ephemeris data 45. Preferably, the selected aging time period is the GPS-specified curve fit interval. Alternatively, aging time period can be selected within a range of two to twelve hours, such as four, six or eight hours.

When the GPS ephemeris data 42 is current, the GPS navigation processing code 36 uses the GPS ephemeris data 42, the code and carrier measurements, the timing of the GPS data bits, and the Z-counts for preferably four GPS satellites for determining location, velocity, and time of the GPS receiver 10 in a conventional manner and updating the location as a last user location data 46 in the memory 20. Fewer than four GPS satellites are necessary when navigation information is available from another source, such as an optional speedometer 47 and/or an optional inertial navigation device 49. However, more than four GPS satellites are often used in order to improve accuracy using an overdetermined solution.

In order to obtain a fast time to first fix when the GPS ephemeris data 42 is no longer current, the memory 20 includes program codes for data selector 51, a satellite velocity calculator 52, a satellite line-of-sight calculator 54, a range rate measurer 56, a user velocity calculator 58, and a user location integrator 62 for calculating a first location fix. The data selector 51 selects stored coarse GPS orbital parameters for either the GPS almanac data 44 or the old GPS ephemeris data 45. Preferably, the data selector 51 selects the old GPS ephemeris data 45 when the ephemeris parameters are less than about two days old and otherwise selects the GPS almanac data 44. The satellite velocity calculator 52 uses the coarse GPS orbital parameters and time for calculating velocities-in-space for selected in-view GPS satellites. The time can be obtained from the real time clock 40 when the error in the approximate time from the real time clock 40 is expected to be small, preferably less than about a second, or from a Z-count in the GPS signal. The satellite line-of-sight calculator 54 uses the coarse GPS orbital parameters and the time for calculating unit vectors for the directions to the selected in-view GPS satellites.

The range rate measurer 56 measures range rates to the selected in-view GPS satellites. Preferably, the range rates are measured from information that is received from the GPS signal processing code 34 for rates of change of the respective carrier phases of the incoming GPS signals. In an alternative embodiment, the range rates are measured from information for the carrier frequencies of the incoming GPS signals. In another alternative, the range rates are measured using information for the code phases of the incoming GPS signals. The user velocity calculator 58 calculates the user velocity from the GPS satellite velocities and unit vectors and the range rates as described in velocity equation 1 below.

$$RR_{s1} = (U_{s1} \cdot (V_u + V_{s1})) + fb_u + n \tag{1}$$

The equation 1 shows that a range rate $RR_{s1}$ for the GPS satellite S1 equals a dot product of the unit vector $U_{s1}$ to the GPS satellite S1 and the sum of the vector velocity-in-space $V_{s1}$ of the GPS satellite S1 and the user vector velocity $V_u$ of the GPS receiver 10; plus a frequency bias error $fb_u$ for the internal reference clocking signal in the GPS receiver 10;

plus noise n. The equation 1 has four unknowns—three unknowns for the three dimensions of the user vector velocity $V_u$ and one unknown for the frequency bias error $fb_u$. The noise n' is measurement noise from several sources including instrumentation noise, ionospheric and tropospheric model errors, and selective availability errors. The velocity equation 1 is repeated for three additional GPS satellites for a total of four simultaneous velocity equations having the same four unknowns. Where four velocity equations are used, the mathematics resolves a single unambiguous user vector velocity $V_u$. The effect of the noise n is to degrade the accuracy of the user vector velocity $V_u$ that is resolved. Fewer than four GPS satellites may be necessary when navigation information is available from another source, such as speed from the speedometer 47 and direction from the inertial navigation device 49, connected through the interface 38. More than four velocity equations corresponding, respectively, to more than four GPS satellites can sometimes be used for an overdetermined solution for improving the accuracy of the user vector velocity $V_u$. In a preferred embodiment, the four equations are solved by first subtracting one of the equations from each of the other three in order to eliminate the term for the frequency bias error $fb_u$ and then using matrix arithmetic on the three resulting equations. The simultaneous solution yields the user vector velocity $V_u$ It may be noted that the calculation of the user vector velocity $V_u$ is much less sensitive than a conventional calculation of a user location to the accuracy of the orbital parameters and time, thereby allowing the use of the coarse orbital parameters and an approximate time for calculating the user vector velocity $V_u$ and then integrating the user vector velocity $V_u$ in the present invention for the first location fix.

The user location integrator 62 integrates the user vector velocity $V_u$ over time to obtain a vector location difference and then adds the vector location difference to the last user location data 46 for obtaining a first location fix as described in an equation 2 below.

$$X_{nu} = {}_0\int^T V_u dt + X_{Lu} \quad (2)$$

The equation 2 shows that the new three dimensional location $X_{nu}$ equals the integral of the three dimensional user velocity $V_u$ times derivative of time "t" taken from a time zero (t=0) to a current time (t=T). The time zero is the time when the GPS replica carrier and incoming signal carrier achieve correlations and the range rate measurer 56 begins measuring range rates to preferably four GPS satellites. It may be noted that the calculation of the user vector velocity $V_u$ is much less sensitive than a conventional calculation of a user location to the accuracy of the orbital parameters and time, thereby allowing the use of the coarse orbital parameters and an approximate time in the present invention for calculating the user vector velocity $V_u$ and then integrating the user vector velocity $V_u$ for the first location fix.

In order to minimize the time to achieve correlation, GPS digital signal processor 16 performs multiple correlations in parallel and the GPS signal processing code 34 uses the approximate time from the real time clock 40, the orbital parameters from the GPS almanac data 44 or the old GPS ephemeris data 45, and the last user location data 46 for selecting certain ones of the GPS satellites that are expected to be visible. The GPS signal processing code 34 calculates predicted Doppler shifted carrier frequencies the PRN codes for those GPS satellites that are selected and narrows the frequency band and the number of codes that must be observed accordingly for rapidly acquiring the GPS signals.

Optionally, the user velocity calculator 58 calculates a user direction in two or three dimensions from the three dimensional user velocity vector $V_u$. The user direction is issued through the interface 38 for initializing the user direction of the inertial navigation device 49 in either two or three dimensions depending. Subsequent inertial information from inertial navigation device 49 and/or speedometer 47 can be used in the GPS receiver 10 for providing additional navigation information for determining the user location.

Figure 2:
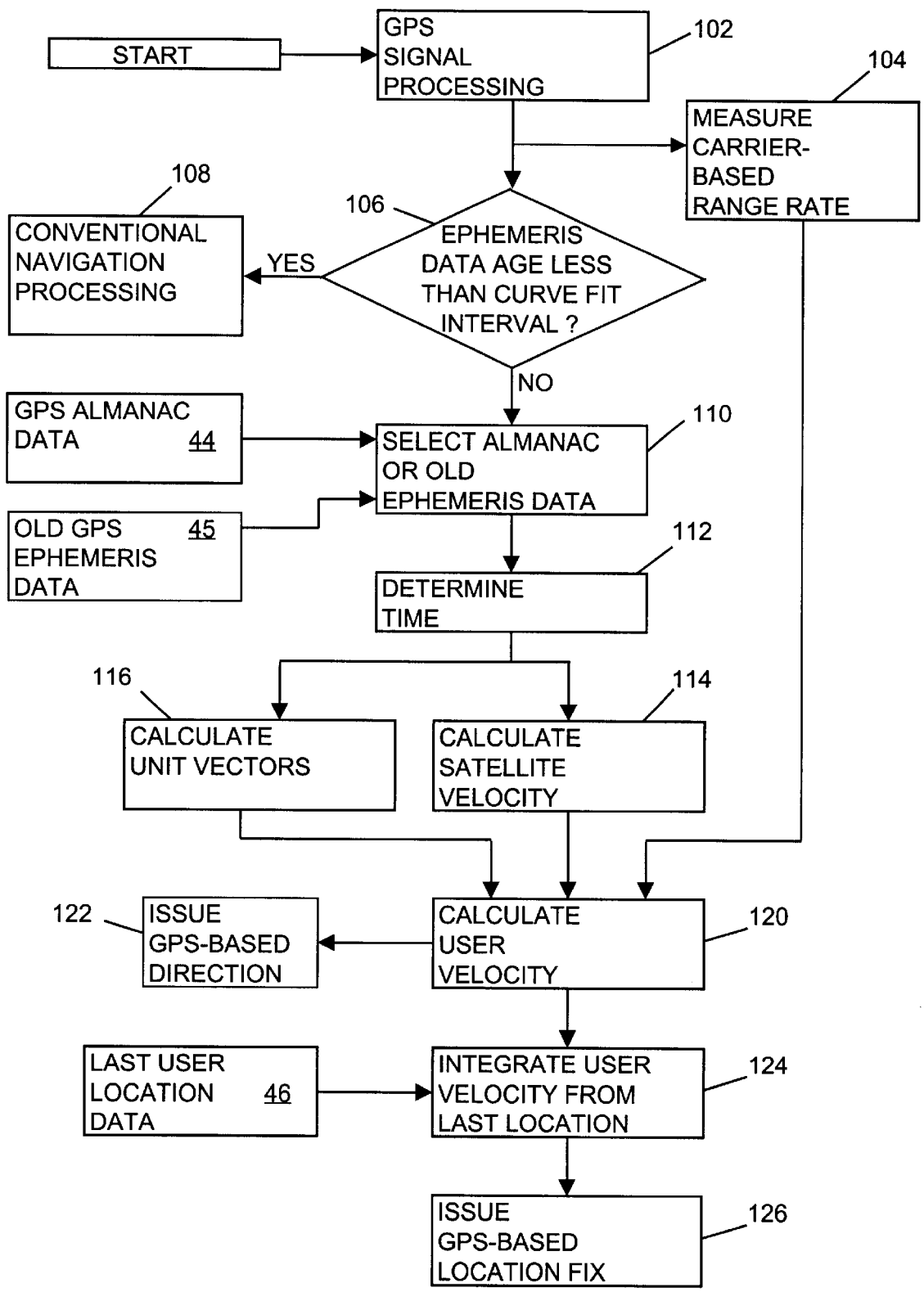
FIG. 2 is a flow chart of a method for a fast time to first fix using the GPS receiver of FIG. 1.

FIG. 2 is flow chart of a method for a fast time to first fix using the GPS receiver 10. At the start the GPS receiver 10 begins receiving the GPS signal after a time period when the GPS signal has been blocked or the GPS receiver 10 has been in a standby mode or turned off. In a step 102 the GPS digital signal processor 16 and the GPS signal processing code 34 cooperate for obtaining code and carrier correlation to the incoming GPS signal. In a step 104 the range rate measurer 56 uses carrier correlations for measuring the phases and/or frequencies of the carriers for determining the rates-of-change of the ranges to the GPS satellites.

In a step 106 the GPS navigation processing code 36 determines when the GPS ephemeris data 42 has aged beyond the selected aging time period, such as the curve fit interval for the GPS system. When the age of the ephemeris parameters is less than the aging time period in a step 108 the GPS navigation processing code 36 operates conventionally for determining a first fix. When the age of the ephemeris parameters is greater than the aging time period, in a step 110 the data selector 51 selects the stored GPS almanac data 44 or the stored old GPS ephemeris data 45 for the coarse GPS orbital parameters. In a step 112 the GPS receiver 10 determines time from the real time clock 40 or the Z-count. In a step 114 the satellite velocity calculator 52 uses the coarse GPS orbital parameters for calculating the velocities of the GPS satellites, and in a step 116 the line-of-sight calculator 54 uses the coarse GPS orbital parameters for calculating the unit vectors to the GPS satellites.

In a step 120 the user velocity calculator 58 uses the range rates, the satellite velocities, and the unit vectors as described in the equation 1 above for calculating the vector user velocity of the GPS receiver 10. In an optional step 122 the user velocity calculator 58 calculates and issues information for a GPS-based user direction of the GPS receiver 10. Then, in a step 124 the user location integrator 62 integrates the user velocity over time and combines the integrated user velocity with the last user location data 46 as described in the equation 2 above for calculating a user location fix of the GPS receiver 10. In a step 126 the user location integrator 62 issues the new GPS-based user location fix.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for determining velocity, comprising steps of:
    calculating one or more satellite velocities for one or more GPS satellites, respectively, from coarse orbital parameters for said one or more GPS satellites, respectively, said coarse orbital parameters including at least one of (i) ephemeris data older than a specified curve fit interval and (ii) almanac data;

measuring one or more range rates to said one or more GPS satellites, respectively; and using said one or more calculated satellite velocities with said one or more measured range rates for calculating a user velocity.

2. The method of claim 1, wherein:

said curve fit interval is in a range of two to twelve hours.

3. The method of claim 1, wherein:

said curve fit interval is four hours.

4. The method of claim 1, further comprising a step of:

receiving non-GPS navigation information from another source; and wherein:

the step of using said one or more calculated satellite velocities with said one or more measured range rates for calculating a user velocity includes using fewer than four said calculated satellite velocities and fewer than four said measured range rates with said navigation information for calculating said user velocity.

5. The method of claim 4, wherein:

the step of receiving said non-GPS navigation information includes a step of receiving a scalar speed from a speed measuring device.

6. The method of claim 1, further comprising steps of:

retrieving a last location fix; and calculating a new location fix from said last location fix and said user velocity.

7. A method for determining direction, comprising steps of:

calculating one or more satellite velocities for one or more GPS satellites, respectively, from coarse orbital parameters for said one or more GPS satellites, respectively, said coarse orbital parameters including at least one of (i) ephemeris data older than a specified curve fit interval and (ii) almanac data;

measuring one or more range rates to said one or more GPS satellites, respectively; and using said one or more calculated satellite velocities with said one or more measured range rates for calculating a user direction.

8. The method of claim 7, wherein:

said curve fit interval is in a range of two to twelve hours.

9. The method of claim 7, wherein:

said curve fit interval is four hours.

10. The method of claim 7, wherein:

receiving non-GPS navigation information from another source; and wherein:

the step of using said one or more calculated satellite velocities with said one or more measured range rates for calculating a user direction includes using fewer than four said calculated satellite velocities and fewer than four said measured range rates with said navigation information for calculating said user direction.

11. The method of claim 10, wherein:

the step of receiving said non-GPS navigation information includes a step of receiving a scalar speed from a speed measuring device.

12. The method of claim 7, further comprising a step of:

using said user direction for initializing an inertial navigation device.

13. An apparatus for determining velocity, comprising:

a satellite velocity calculator for calculating one or more satellite velocities for one or more GPS satellites, respectively, from coarse orbital parameters for said one or more GPS satellites, respectively, said coarse orbital parameters including at least one of (i) ephemeris data older than a specified curve fit interval and (ii) almanac data;

a range rate measurer for measuring one or more range rates to said one or more GPS satellites, respectively; and a user velocity calculator for using said one or more calculated satellite velocities with said one or more measured range rates for calculating a user velocity.

14. The apparatus of claim 13, wherein:

said curve fit interval is in a range of two to twelve hours.

15. The apparatus of claim 13, wherein:

said curve fit interval is four hours.

16. The apparatus of claim 13, wherein:

the user velocity calculator is further for receiving navigation information from a non-GPS source and using fewer than four said calculated satellite velocities and fewer than four said measured range rates with said navigation information for calculating said user velocity.

17. The apparatus of claim 16, wherein:

said source is a speedometer for determining a scalar speed for said navigation information.

18. The apparatus of claim 13, further comprising:

a user location integrator for retrieving a last location fix and calculating a new location fix from said last location fix and said user velocity.

19. An apparatus for determining direction, comprising:

a satellite velocity calculator for calculating one or more satellite velocities for one or more GPS satellites, respectively, from coarse orbital parameters for said one or more GPS satellites, respectively, said coarse orbital parameters including at least one of (i) ephemeris data older than a specified curve fit interval and (ii) almanac data;

a range rate measurer for measuring one or more range rates to said one or more GPS satellites, respectively; and a direction calculator for using said one or more calculated satellite velocities with said one or more measured range rates for calculating a user direction.

20. The apparatus of claim 19, wherein:

said curve fit interval is in a range of two to twelve hours.

21. The apparatus of claim 19, wherein:

said curve fit interval is four hours.

22. The apparatus of claim 19, further comprising:

the user velocity calculator is further for receiving navigation information from a non-GPS source and using fewer than four said calculated satellite velocities and fewer than four said measured range rates with said navigation information for calculating said user direction.

23. The apparatus of claim 22, wherein:

said source is a speedometer for determining a scalar speed for said navigation information.

24. The apparatus of claim 19, further comprising:

an inertial navigation device for using said user direction as an initial direction.

* * * * *